US011299668B2

(12) United States Patent
Nguyen et al.

(10) Patent No.: US 11,299,668 B2
(45) Date of Patent: Apr. 12, 2022

(54) METHODS AND COMPOSITIONS FOR ACIDIZING AND STABILIZING FORMATION OF FRACTURE FACES IN THE SAME TREATMENT

(71) Applicant: Halliburton Energy Services, Inc., Houston, TX (US)

(72) Inventors: Philip D. Nguyen, Houston, TX (US); Loan K. Vo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 6 days.

(21) Appl. No.: 16/645,331

(22) PCT Filed: Nov. 9, 2017

(86) PCT No.: PCT/US2017/060804
§ 371 (c)(1),
(2) Date: Mar. 6, 2020

(87) PCT Pub. No.: WO2019/094014
PCT Pub. Date: May 16, 2019

(65) Prior Publication Data
US 2021/0032530 A1    Feb. 4, 2021

(51) Int. Cl.
*E21B 43/27* (2006.01)
*E21B 33/138* (2006.01)
*C09K 8/80* (2006.01)
*C09K 8/72* (2006.01)

(52) U.S. Cl.
CPC ............... *C09K 8/725* (2013.01); *C09K 8/80* (2013.01); *E21B 33/138* (2013.01); *E21B 43/27* (2020.05)

(58) Field of Classification Search
None
See application file for complete search history.

(56) References Cited

U.S. PATENT DOCUMENTS

| 3,759,327 | A  |   | 9/1973  | Carnes |              |
|-----------|----|---|---------|--------|--------------|
| 4,669,543 | A  |   | 6/1987  | Young  |              |
| 4,741,401 | A  | * | 5/1988  | Walles | C09K 8/685   |
|           |    |   |         |        | 166/300      |
| 5,678,632 | A  | * | 10/1997 | Moses  | C09K 8/528   |
|           |    |   |         |        | 166/307      |
| 5,692,566 | A  |   | 12/1997 | Surles |              |
| 6,209,646 | B1 | * | 4/2001  | Reddy  | C04B 40/0633 |
|           |    |   |         |        | 166/293      |
| 6,444,316 | B1 | * | 9/2002  | Reddy  | B01J 13/22   |
|           |    |   |         |        | 428/407      |

(Continued)

FOREIGN PATENT DOCUMENTS

| WO | 2003102086 A2 | 12/2003 |
|----|---------------|---------|
| WO | 2016108877 A1 | 7/2016  |

OTHER PUBLICATIONS

International Search Report and Written Opinion dated Jul. 31, 2018; International PCT Application No. PCT/US2017/060804.

*Primary Examiner* — Charles R Nold
(74) *Attorney, Agent, or Firm* — McGuireWoods LLP

(57) ABSTRACT

An acidizing and formation stabilizing treatment fluid for stabilizing a fracture in a subterranean formation. An acid generating agent generates an acid in situ to acidize the formation thereby enhancing the fractures within and to cure an acid-catalyzed, curable resin to stabilize the formation.

20 Claims, 2 Drawing Sheets

(56) References Cited

U.S. PATENT DOCUMENTS

| | | | |
|---|---|---|---|
| 6,800,717 B2 | 10/2004 | Walker et al. | |
| 6,881,709 B2 * | 4/2005 | Nelson | C09K 8/536 |
| | | | 507/203 |
| 7,140,438 B2 | 11/2006 | Frost et al. | |
| 7,237,609 B2 | 7/2007 | Nguyen | |
| 7,252,146 B2 * | 8/2007 | Slabaugh | C09K 8/68 |
| | | | 166/280.1 |
| 7,350,571 B2 * | 4/2008 | Nguyen | C09K 8/508 |
| | | | 166/276 |
| 7,455,112 B2 | 11/2008 | Moorehead et al. | |
| 9,222,344 B2 * | 12/2015 | Vo | C09K 8/845 |
| 9,512,350 B2 | 12/2016 | Vo et al. | |
| 2005/0051330 A1 | 3/2005 | Nguyen | |
| 2005/0061509 A1 * | 3/2005 | Nguyen | E21B 33/138 |
| | | | 166/307 |
| 2007/0039733 A1 * | 2/2007 | Welton | C09K 8/80 |
| | | | 166/276 |
| 2012/0305247 A1 | 12/2012 | Chen et al. | |
| 2016/0244659 A1 | 8/2016 | Shahin et al. | |
| 2016/0289549 A1 | 10/2016 | Nelson et al. | |

\* cited by examiner

METHODS AND COMPOSITIONS FOR ACIDIZING AND STABILIZING FORMATION OF FRACTURE FACES IN THE SAME TREATMENT

BACKGROUND

The present disclosure relates to methods for stimulation and stabilization of subterranean formations.

Subterranean formations penetrated by wellbores are often treated with acidizing treatment fluids to stimulate the production of hydrocarbons therefrom. One such acidizing treatment involves the introduction of an acidizing treatment fluid into a subterranean formation such that the acidizing treatment fluid contacts the subterranean formation or a desired portion of a subterranean formation (e.g., a proppant pack in a propped fracture). The acidizing treatment fluid reacts with acid soluble materials contained in the subterranean formation (or contained in the proppant pack) thereby etching channels into the subterranean formation and increasing the permeability of the formation. Another acidizing treatment, termed "fracture-acidizing," involves fracturing a subterranean formation using an acidizing treatment fluid such that the acidizing treatment fluid etches channels in the faces of the formed fractures thereby creating flow-paths for the production of hydrocarbons. Acidizing treatment fluids may also enlarge pore spaces within a subterranean formation and within fracture faces. Additionally, acidizing treatment fluids may be used to remove materials clogging the interstitial spaces in proppant packs used to prop fractures open, thereby restoring the conductivity of a proppant pack.

Subterranean formations treated with acidizing treatment fluids may be used to initially stimulate hydrocarbon production or to restore hydrocarbon production in a formation exhibiting reduced production due to plugging of conductivity channels with unconsolidated particulates in the formation, such as formation fines or scale deposits. However, often the production capacity of an acid treated formation is reduced prematurely due to continued plugging of the acid-formed channels with unconsolidated particulates. These unconsolidated particulates may invade the channels in a formation or in a proppant pack because there is no cohesion between the grains, or the grains and the formation, to anchor the unconsolidated particulates in place and prevent them from migrating and plugging production channels.

The present disclosure provides methods for treating a subterranean formation with an acidizing treatment and for stabilizing the same.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
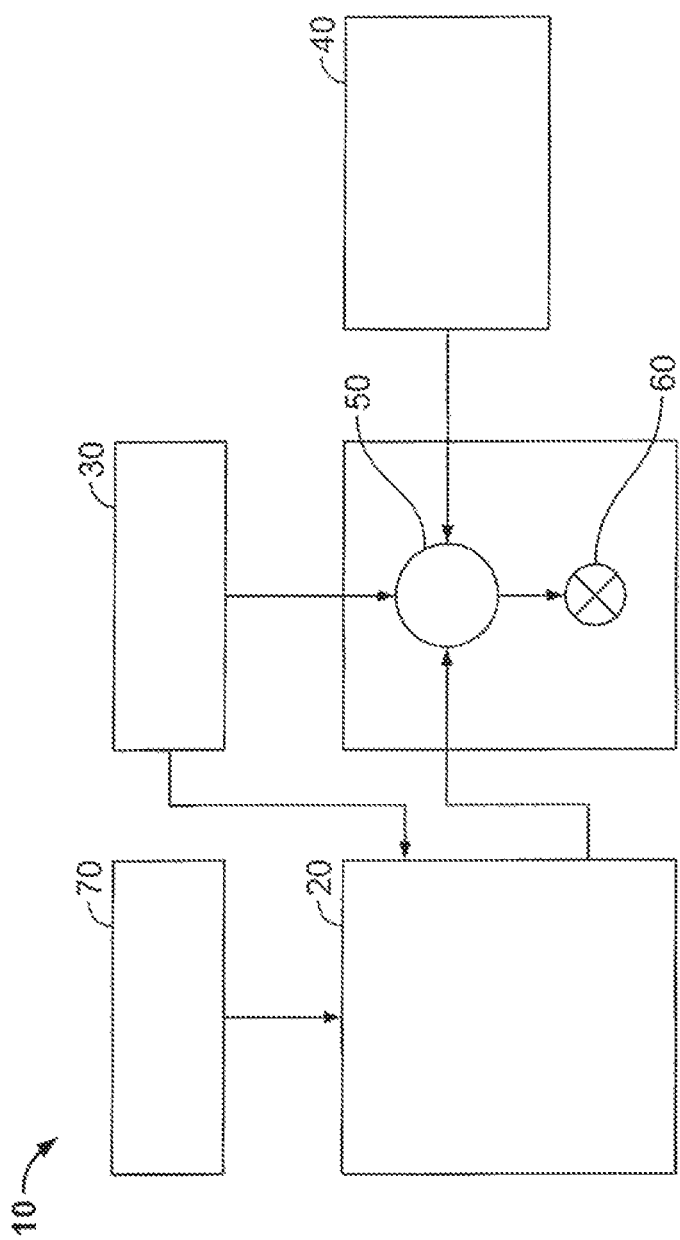
FIG. 1 is a diagram illustrating an example of a fracturing system that may be used in accordance with certain embodiments of the present disclosure.

The embodiments herein relate to in situ generation of acid for use in subterranean formation operations and stabilization of the acidized subterranean formation with a resin. Specifically, the embodiments herein relate to acid generating agents, which generate an acid in situ and to curing or crosslinking an acid-catalyzed, curable resin with an in situ generated acid. The presence of the in situ generated acid may permit the creation of microfractures within a desired interval of the subterranean formation, such as a fracture. As used herein, the term "microfracture" refers to a discontinuity in a portion of the subterranean formation (e.g., a fracture) such that an etch is created in the formation. Microfractures may be channels, perforations, holes, or other ablations within the formation. The microfractures created by the in situ generated acid in some embodiments herein may increase the contact surface areas with the formation matrix for enhancing desorption of hydrocarbons, or may increase the conductivity of a fracture and the overall productivity of a subterranean formation. The acid-catalyzed curable resin will consolidate, strengthen, and/or stabilize the acidized formation surrounding the created fissures or channels, thereby locking the formation materials in place without allowing them to migrate during well production.

Although some embodiments described herein are illustrated by reference to acidizing treatments and fracture-acidizing, the treatment fluid compositions disclosed herein may be used in any subterranean formation operation that may benefit from the presence of a controlled release acid and a stabilizing resin. Such treatment operations may include, but are not limited to, a drilling operation; a stimulation operation; a hydraulic stimulation operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; water injection or disposal well completion; and any combination thereof. Furthermore, the embodiments described herein may be used in full-scale subterranean operations or pills. As used herein, the term "pill" refers to a relatively small volume of specially prepared fluid (e.g., drilling fluid) placed or circulated in a wellbore. The subterranean formation may be any source rock comprising organic matter (e.g., oil or natural gas), such as shale, sandstone, carbonate, coalbed, or limestone and may be subsea.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, a method for acidizing and stabilizing a subterranean formation is provided comprising introducing a first treatment fluid comprising a first base fluid and an in situ acid generating agent into a subterranean formation; introducing a second treatment fluid comprising a second base fluid and an acid-catalyzed, curable resin into the subterranean formation; wherein the second treatment fluid is introduced into the subterranean formation within about a few minutes to about 15 days of introducing the first treatment fluid into the subterranean formation; wherein the in situ acid generating agent generates a first portion of acid in the subterranean formation, the first portion of acid creating or enhancing one or more microfissures therein; and wherein the in situ acid generating agent generates a second portion of acid in the subterranean formation, and the second portion of acid catalyzes a reaction whereby the acid-catalyzed, curable resin is transformed into a cured resin. In some embodiments, the second treatment fluid further comprises a second acid generating agent, wherein the second acid generating agent can be the same or different as the acid generating agent of the first treatment fluid. In some embodiments, the second treatment fluid is introduced into the subterranean formation within about 10 days of introducing the first treatment fluid into the subterranean formation. In some embodiments, the second treatment fluid is introduced into the subterranean formation within about 5 days of introducing the first treatment fluid into the subterranean formation. In some embodiments, the second treatment fluid is introduced into the subterranean formation within about 1 day of introducing the first treatment fluid into the subterranean formation.

When the first treatment fluid is introduced into the subterranean formation, the in situ acid generating agent will begin to generate a first portion of acid, which will acidize and/or etch one or more microfissures in the subterranean formation. The amount of time required for adequate acidizing and/or etching treatment will depend upon the particular in situ acid generating agent used. In some embodiments, the second treatment fluid can be introduced immediately after the first treatment fluid, after about 0 minutes, about 5 minutes, about 30 minutes, about 45 minutes, about 1 hour, about 2 hours, about 3 hours, about 4 hours, about 5 hours, about 6 hours, about 7 hours, about 8 hours, about 9 hours, about 10 hours, about 12 hours, about 14 hours, about 16 hours, about 18 hours, or about 20 hours and up to about 5 hours, about 10 hours, about 15 hours, about 20 hours, about 1 day, about 2 days, about 3 days, about 5 days, about 10 days, or about 15 days after introduction of the first treatment fluid. In some embodiments, the second treatment fluid is introduced within about 1, about 5, about 10, or about 15 days of introducing the first treatment fluid. The introduction of the second treatment fluid within the proper time frame after introducing the acidizing first treatment fluid allows residual acids (a second portion) from the acidizing treatment of the first treatment fluid to catalyze the curing of the acid-catalyzed curable resin, which will consolidate, stabilize, and/or strengthen the one or more microfissures of the subterranean formation. The second portion of acid or the residual acid is generally that acid generated by the in situ acid generating agent that does not constitute a part of the acidizing and/or etching process. Thus, the generation of acid from the acid generating agent has the dual function of acidizing and etching the formation and activating the curing reaction. In addition, the timely introduction of the second treatment fluid significantly reduces the risk of plugging of the acid-formed channels with unconsolidated particulates.

In some embodiments, a method is provided comprising introducing an acidizing and formation stabilizing treatment fluid into a subterranean formation, the acidizing and formation stabilizing treatment fluid comprising a base fluid, an in situ acid generating agent, and an acid-catalyzed, curable resin; wherein the acid-catalyzed curable resin is encapsulated with a degradable capsule; wherein the in situ acid generating agent generates a first portion of acid in the subterranean formation, the first portion of acid creating or enhancing one or more microfissures therein; wherein the capsule undergoes a degradation after a predetermined amount of time, generating an unencapsulated acid-catalyzed curable resin; wherein the in situ acid generating agent generates a second portion of acid in the subterranean formation, and the second portion of acid catalyzes a reaction whereby the unencapsulated acid-catalyzed curable resin is cured.

By encapsulating the acid-catalyzed curable resin, the capsule protects the acid-catalyzed curable resin from being activated or cured by acid generated in the treatment fluid. This protection allows the generated acid to acidize and/or etch the subterranean formation, and produce or enhance one or more microfissures without prematurely inducing a curing reaction. The capsule is designed to be broken, degraded, or disrupted after a predetermined amount of time, thereby removing the protection of the acid-catalyzed curable resin, which can then be activated or cured by residual acid (a second portion) generated by the in situ acid generating agent. Once cured, the resin will stabilize, consolidate, and/or strengthen the formation surrounding one or more microfissures. In some embodiments, the capsule is degraded by thermal degradation, chemically induced degradation (e.g., a chemical breaker), exposure to a shear force, or a combination thereof. In some embodiments, the degradation of the capsule begins after a microfissure has been formed or enhanced by an acid. In some embodiments, the degradation of the capsule begins before completion of the acidizing and/or etching of one or more microfissures.

The in situ acid generating agent for use in the treatment fluids described in some embodiments herein may be any compounds that will generate an acid downhole in a delayed fashion that will then acidize the formation. In this way, a strong acid, which completely dissociates into an acidic component and its conjugate base upon addition to an aqueous medium, is not used. Rather, through use of an in situ acid generating agent, the acid is generated downhole in a delayed or controlled manner. In some embodiments, an in situ acid generating agent is selected that can be accurately controlled with respect to the hydrolysis time of the in situ acid generating agent so that acid is delivered to the portion of the subterranean formation in which it is needed. The particular acid generating reaction rate depends on the kinetic properties of the particular in situ acid generating agent, the temperature of application, and the concentration of the in situ acid generating agent. In addition, the in situ acid generating agent may be reacted with small amounts of reactive materials such as mineral acids, organic acids, acidic anhydrides, p-toluenesulfonic acid, etc. to lower the pH to accelerate the hydrolysis of the acid-generating compound. Similarly, the hydrolysis rate may be accelerated by the addition of a small amount of a strong base such as NAOH, $Na_2CO_3$, and $Mg(OH)_2$, however, the resultant acid may be neutralized by the presence of base, and an acid may have a similar effect. The in situ acid generating agent also may generate alcohols downhole that may be beneficial to the operation.

Suitable in situ acid generating agents will be apparent to one of ordinary skill, and can include synthetic in situ acid generating agents comprising urea and hydrogen chloride, examples of which are described in detail in U.S. Patent Application Pub. No. 2017/0096596, U.S. Patent Application Pub. No. 2017/0101350, U.S. Patent Application Pub. No. 2017/0210980, U.S. Patent Application Pub. No. 2017/0275522, U.S. Patent Application Pub. No. 2017/0292066, U.S. Patent Application Pub. No. 2017/0306503, and U.S. Patent Application Pub. No. 2017/0313932. These synthetic acid generating agents can include a synthetic acid generating agent comprising urea and hydrogen chloride in a molar ratio of not less than 0.1:1; preferably in a molar ratio not less than 0.5:1, more preferably in a molar ratio not less than 1.0:1; a metal iodide or iodates, preferably cupric iodide, potassium iodide, lithium iodide or sodium iodide; in an amount ranging from 0.01-0.5%, preferably in an amount of approximately 0.022%; potassium iodide is the preferred compound; an alcohol or derivative thereof, preferably alkynyl alcohol, more preferably a derivative of propargyl alcohol; in an amount ranging from 0.1-2.0%, preferably in an amount of approximately 0.25%; 2-Propyn-1-ol, complexed with methyloxirane is the preferred component; optionally, formic acid or a derivative thereof selected from the group consisting of: acetic acid, ethylformate and butyl formate are present in an amount ranging from 0.05-2.0%, preferably in an amount of approximately 0.1%; formic acid is the preferred compound; optionally, cinnamaldehyde or a derivative amine thereof; present in an amount ranging from 0.01-1.0%, preferably in an amount of approximately 0.03%; cinnamaldehyde is the preferred compound; optionally a propylene glycol or a derivative thereof present in an amount ranging from 0.05-1.0%, preferably in an amount of approximately 0.05%; propylene glycol is the preferred compound; and optionally, a phosphonic acid or derivatives; preferably alkylphosphonic acid or derivatives thereof and more preferably amino tris methylene phosphonic acid and derivatives thereof.

In some embodiments, the in situ acid generating agent comprises an ammonium salt of an organic acid or an inorganic acid. In some embodiments, the ammonium salt of an organic acid or an inorganic acid is selected from the group consisting of ammonium formate, ammonium oxalate, ammonium bisulfite, ammonium bisulfate, monobasic ammonium phosphate, dibasic ammonium phosphate, ammonium nitrate, ammonium sulfamate, ammonium sulfate, ammonium sulfite, and combinations thereof. In some embodiments, the ammonium salt of an organic acid or an inorganic acid is selected from ammonium citrates or ammonium acetate. Other suitable ammonium salts of an organic acid or inorganic acid will be apparent to one of skill in the art.

In some embodiments, the in situ acid generating agent comprises an acid ester. In some embodiments, the in situ acid generating agent may be chosen from the group consisting of any esters and formates that are water soluble or partially soluble. Particularly suitable acid-generating compounds for use in the present invention include lactic acid derivatives, methyl lactate, ethyl lactate, propyl lactate, butyl lactate. Other suitable acid-generating compounds include: formate esters including, but are not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Of these, ethylene glycol monoformate and diethylene glycol diformate may be preferred. Examples of suitable esters also include esters or polyesters of glycerol including, but not limited to, tripropionin (a triester of propionic acid and glycerol), trilactin, and esters of acetic acid and glycerol such as monoacetin, diacetin, and triacetin. Optionally, the acid-generating compound(s) may include esters; aliphatic polyesters; poly(lactides); poly(glycolides); poly(ε-caprolactones); poly(hydroxybutyrates); poly(anhydrides); aliphatic polycarbonates; poly(amino acids); and polyphosphazenes; or copolymers thereof. Derivatives and combinations also may be suitable. Various combinations of the esters or polyesters of hydroxy acid and/or glycerol also may be employed to adjust the half-life of the hydrolysis reactions. Ethyl lactate may be considered a particularly good lactate ester due to its ability to hydrolyze over the wide temperature range of from about 60° C. to about 150° C., with its half-life being particularly useful at temperatures ranging from about 80° C. to about 140° C. Further, ethyl lactate may be relatively inexpensive, and widely available.

In some embodiments, the in situ acid generating agent may be a slow release acid. As used herein, the term "slow release acid" refers to an acid that only ionizes upon time, temperature, and/or pH. Suitable slow release acids may include, but are not limited to, paratoluene sulfonate ester; phosphonate ester; trimethyl formate; methyl methanesulfonate; methyl trifluoroacetate; and any combination thereof. In some embodiments, the slow release in situ acid generating agent is methansulfonic acid.

The concentration of the in situ acid generating agent in the treatment fluids of the present disclosure may range from about 1% to about 100% based on weight. The particular concentration used in any particular embodiment depends on what acid-generating compound is being used, and what percentage of acid is generated. Other complex, interrelated factors that may be considered in deciding how much of the acid-generating compound to use include, but are not limited to, the composition of the formation, the temperature of the formation, the pressure of the formation, the particular fines and damage present in the formation (e.g., scale, skin, calcium carbonate, silicates, and the like), the particular acid-generating compound used, the expected contact time of the generated acid with the formation, etc. The desired contact time also depends on the particular application and purpose. For example, if very delayed acidizing is desired, then it may be desirable to pump a dilute, low concentration but a high volume to get deeper penetration. For matrix stimulation treatments, the expected contact time may be determined from the maximum pumping rate that does not cause the downhole pressure to exceed the fracturing pressure.

For damage or fines removal procedures, the expected contact time of the in situ acid generating agent may be based on laboratory tests, but usually should allow for extended contact periods as compared to conventional acid treatments. For instance, in conventional treatments where a live acid is pumped to remove scale or fines, that acid may react instantaneously so clean up of the entire amount of damage and fines may be impossible.

In some embodiments, the in situ acid generating agent may be present in the treatment fluids described herein, either alone or in combination with the acid-catalyzed, curable resin in the amount of a lower limit of about 1%, 1.5%, 2%, 2.5%, 3%, 3.5%, 4%, 4.5%, 5%, 5.5%, 6%, 6.5%, 7%, 7.5%, 8%, 8.5%, 9%, 10%, 10.5%, 11%, 11.5%, 12%, and 12.5% to an upper limit of about 25%, 24.5%, 24%, 23.5%, 23%, 22.5%, 22%, 21.5%, 21%, 20.5%, 20%, 19.5%, 19%, 18.5%, 18%, 17.5%, 17%, 16.5%, 16%, 15.5%, 15%, 14.5%, 14%, 13.5%, 13%, and 12.5% by volume of the treatment fluid.

Resins suitable for stabilizing, consolidating, and/or strengthening microfissures of a subterranean formation in the treatment fluids of the present disclosure are those which are acid-catalyzed, curable resins. Acid-catalyzed, curable resins can be selected from any resin material that will transform from an uncured state to a cured state upon activation, catalysis, or reaction with an acidic medium. In some embodiments, the acid-catalyzed curable resin is crosslinked upon activation, catalysis, or reaction with an acidic medium. In some embodiments, activation, catalysis, or reaction with an acidic medium hardens the acid-catalyzed, curable resin.

In some embodiments, the acid-catalyzed curable resin comprises one selected from the group consisting of monopolymers of furfuryl alcohol; furan resin; resins obtained by condensation of phenol with furfuryl alcohol; furfuryl-ketone polymers; phenol formaldehyde resins; resin from the condensation of 2,2'-biphenol, ethylene diamine and formaldehyde; melamine resin; alkyldiamino resins; urea formaldehyde resins; and combinations thereof. Other suitable examples of acid-catalyzed curable resins will be apparent to one of skill in the art.

In some embodiments, the acid-catalyzed, curable resin may be present in the treatment fluids described herein, either alone or in combination with the in situ acid generating agent, in the amount of a lower limit of about 1%, 1.5%, 2%, 2.5%, 3%, 3.5%, 4%, 4.5%, 5%, 5.5%, 6%, 6.5%, 7%, 7.5%, 8%, 8.5%, 9%, 10%, 10.5%, 11%, 11.5%, 12%, and 12.5% to an upper limit of about 25%, 24.5%, 24%, 23.5%, 23%, 22.5%, 22%, 21.5%, 21%, 20.5%, 20%, 19.5%, 19%, 18.5%, 18%, 17.5%, 17%, 16.5%, 16%, 15.5%, 15%, 14.5%, 14%, 13.5%, 13%, and 12.5% by volume of the treatment fluid.

In some embodiments, the acid-catalyzed curable resin is protected by an encapsulating agent, which partially or completely forms a capsule surrounding the acid-catalyzed curable resin. In some embodiments, the encapsulating agent completely surrounds the acid-catalyzed curable resin. The encapsulating agent can be any suitable material that can protect the acid-catalyzed curable resin from premature reaction with an in situ generated acid. Thus, encapsulating agents which degrade too quickly or are otherwise quickly disrupted in the presence of an acid are not suitable for use in the present methods. However, acid-degradable encapsulating agents are suitable when the susceptibility to acid degradation has a slow kinetic profile and allows for sufficient acidizing and or etching to take place in the formation.

In some embodiments, the encapsulating agent comprises an agent is selected from the group consisting of gelatin, gum arabic, starches, shellac, and rosin, polyvinyl alcohol, polyethylene, polypropylene, polystyrene, polyacrylamides, polyethers, polyesters, polyamides, polybutadiene, polyisoprene, silicones, epoxies, polyurethanes, polyurethane copolyethers, alkylacrylate-acrylic acid copolymer, and combinations thereof.

Common microencapsulation processes can be viewed as a series of steps. First, the core material which is to be encapsulated is emulsified or dispersed in a suitable dispersion medium. This medium is preferably aqueous but involves the formation of a polymer rich phase. Most frequently, this medium is a solution of the intended capsule wall material. The solvent characteristics of the medium are changed such as to cause phase separation of the wall material. The wall material is thereby contained in a liquid phase which is also dispersed in the same medium as the intended capsule core material (i.e., acid-catalyzed curable resin). The liquid wall material phase deposits itself as a continuous coating about the dispersed droplets of the internal phase or capsule core material. The wall material is then solidified.

Gelatin or gelatin-containing microcapsule wall material is well known. For example, teachings of the phase separation processes, or coacervation processes are described in U.S. Pat. Nos. 2,800,457 and 2,800,458. In general, the microcapsules, which are formed of dense, gelled complex colloid material, are formed by causing deposition of complex colloid material around curable resin as nuclei by a process of causing coacervation by dilution or adjustment of the pH to occur in a mixture of two different colloid sols in which the curable resin is dispersed, and then gelling the complex colloid. The gellable colloid materials used in the sols must be ionizable and exist in the mixture with opposite electric charges. This may be brought about by selection of the colloid materials or by adjusting the pH of the sol mixture in which the oil droplets are dispersed in the event one or both of the colloids are amphoteric. Examples of ionizable hydrophilic colloid material include, but are not limited to substances such as gelatin; albumen; alginates, such as sodium alginate; casein; agar-agar; starch; pectins; carboxy-methylcellulose; Irish moss; and gum arabic.

In-situ polymerization, microcapsule walls are formed from materials present in a discontinuous phase. Thus, the wall forming materials dispersed into the discontinuous phase polymerize and migrate outward to the interface between the discontinuous and continuous phases, resulting in the formation of a microcapsule wall. Known techniques of in situ polymerization include free radical polymerization and the incorporation of reactive polyisocyanates and polyol compounds within the discontinuous phase.

The microcapsule can be formed from materials comprising gellable carboxymethyl cellulose, gelatin, gelatin-gum arabic, methylated methylol melamine resin, melamine formaldehyde, dimethylol urea, methylol melamine, methylated dimethyl urea, a gelatin anionic polymer, alkyl acrylate-acrylic acid copolymer or other commonly-used polymeric materials used in coacervation.

The invention is not limited to one manner of microencapsulation. Processes of microencapsulation are now well known in the art. U.S. Pat. Nos. 2,730,456, 2,800,457; and 2,800,458 describe methods for capsule formation. Other useful methods for microcapsule manufacture are: U.S. Pat. Nos. 4,001,140; 4,081,376 and 4,089,802 describing a reaction between urea and formaldehyde; U.S. Pat. No. 4,100,103 describing reaction between melamine and formaldehyde; British Pat. No. 2,062,570 describing a process for producing microcapsules having walls produced by polymerization of melamine and formaldehyde in the presence of a styrenesulfonic acid. Microcapsules are also taught in U.S. Pat. Nos. 2,730,457 and 4,197,346. One suitable example is alkyl acrylate-acrylic acid copolymer capsules as taught in U.S. Pat. No. 4,552,811.

Preferably the capsules employed are from 0.1 to 100 microns, preferably 1 to 50 microns, more preferably less than 40, and most preferably less than 30 microns. Other sizes are possible for specific applications.

The conditions for encapsulation will vary based upon the choice of the material used for the capsule wall. Suitable materials for the capsule walls include natural materials such as gelatin, gum arabic, starches, shellac, and rosin, polymers such as polyvinyl alcohol, polyethylene, polypropylene, polystyrene, polyacrylamides, polyethers, polyesters, polyamides, polybutadiene, polyisoprene, silicones, polyurethanes, and copolymers such as polyurethane copolyethers. Alkylacrylate-acrylic acid copolymer is a preferred wall material. Generally, the wall material should have low permeability, at least with respect to the material to be encapsulated. Likewise, it may be important for the microcapsule wall to be impermeable or of low permeability to the curable component of the curable composition so as to prevent any ingress of the same of external materials.

Any aqueous base fluid may be used as the first or second aqueous base fluids for use in the present invention. The first or second aqueous base fluids may be identical or may be different fluid types. One of ordinary skill in the art, with the benefit of this disclosure, will recognize when it may be of benefit to use the same or different fluids as the first and/or second aqueous base fluids of the present invention. Factors that may affect whether or not to use the same fluid include, for example, fluid availability, ease of handling, the particular acid generating agent used, the particular type of curable resin used, the type of subterranean operations being performed, and the like. In certain embodiments, the pH of the aqueous base fluid may be adjusted to (e.g., by a buffer or other pH adjusting agent), among other purposes, effect the viscosity of the one-step acidizing treatment fluid. One of ordinary skill in the art, with the benefit of this disclosure, will recognize when such pH adjustments are appropriate. In some embodiments, the pH range may range from about 4 to about 11.

Suitable base fluids for use in the treatment fluids described herein may include, but are not limited to, an aqueous base fluid, an aqueous-miscible fluid, a water-in-oil emulsion, an oil-in-water emulsion; and any combination thereof. Suitable aqueous-based fluids may include fresh water; saltwater (e.g., water containing one or more salts dissolved therein); brine (e.g., saturated salt water); seawater; and any combination thereof. Generally, the aqueous base fluid may be from any source (e.g., produced water) provided that it does not contain constituents that may adversely affect the in situ acid generating agent and/or acid-catalyzed, curable resin described herein. Suitable aqueous-miscible fluids may include, but not be limited to, an alcohol (e.g., methanol, ethanol, n-propanol, isopropanol, n-butanol, sec-butanol, isobutanol, and t-butanol); a glycerin; a glycol (e.g., polyglycols, propylene glycol, and ethylene glycol); a polyglycol amine; a polyol; any derivative thereof; any in combination with a salt (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous base fluid; and any combination thereof.

Suitable water-in-oil and oil-in-water emulsions may comprise any suitable aqueous base fluid and/or aqueous-miscible for use in the embodiments herein, including those described herein, and an oil including, but not limited to, an alkane; an olefin; an aromatic organic compound; a cyclic alkane; a paraffin; a diesel fluid; a mineral oil; a desulfurized hydrogenated kerosene; and any combination thereof. Suitable water-in-oil emulsions, also known as invert emulsions, may have an oil-to-water ratio from a lower limit of greater than about 50:50, 55:45, 60:40; 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Suitable oil-in-water emulsions may have a water-to-oil ratio from a lower limit of greater than about 50:50, 55:45, 60:40, 65:35, 70:30, 75:25, or 80:20 to an upper limit of less than about 100:0, 95:5, 90:10; 85:15, 80:20, 75:25, 70:30, or 65:35 by volume in the base fluid, where the amount may range from any lower limit to any upper limit and encompass any subset therebetween.

In some embodiments, the treatment fluids described herein may further comprise an additive selected from the group consisting of a salt; a weighting agent; a fluid loss control agent; an emulsifier; a dispersion aid; a corrosion inhibitor; an emulsion thinner; an emulsion thickener; a gelling agent; a surfactant; a particulate; a proppant particulate; a cutting agent; a lost circulation material; a gas; a foaming agent; a pH control additive; a breaker; a biocide; a crosslinking agent; a stabilizer; a chelating agent; a scale inhibitor; a gas hydrate inhibitor; a mutual solvent; an oxidizer; a reducer; a friction reducer; a clay stabilizing agent; and any combination thereof.

In some embodiments, the treatment fluids described herein may additionally be gelled, foamed, or both gelled and foamed. This may be particularly beneficial if the treatment fluid comprises particulates in order to more uniformly suspend the particulates while pumping the fluid into the subterranean formation. In those embodiments where the treatment fluid is gelled and/or foamed, it may be preferred to break the fluid prior to removing it from the subterranean formation. As used herein, the term "break" refers to causing a fluid to become less viscous in order to more easily remove it from a subterranean formation.

In some embodiments, the treatment fluids described herein may be gelled by including a gelling agent and, optionally, a crosslinking agent. Suitable gelling agents may comprise polymers; synthetic polymers; and any combinations thereof. A variety of gelling agents can be used in conjunction with the embodiments described herein, including, but not limited to, hydratable polymers that contain one or more functional groups such as hydroxyl; cis-hydroxyl; carboxylic acids; derivatives of carboxylic acids; sulfate; sulfonate; phosphate; phosphonate; amino; or amide. In certain embodiments, the gelling agents may be polymers comprising polysaccharides, and derivatives thereof that contain one or more of these monosaccharide units including, but not limited to, galactose; mannose; glucoside; glucose; xylose; arabinose; fructose; glucuronic acid; or pyranosyl sulfate. Examples of suitable polymers include, but are not limited to, guar gum and derivatives thereof (e.g., hydroxypropyl guar and carboxymethylhydroxypropyl guar); carboxymethyl guar; and cellulose derivatives (e.g., carboxymethyl cellulose and hydroxyethyl cellulose). Additionally, synthetic polymers and copolymers that contain the above-mentioned functional groups may be used. Examples of such synthetic polymers may include, but are not limited to, polyacrylate; polymethacrylate; polyacrylamide; polyvinyl alcohol; polyvinylpyrrolidone; and any combinations thereof. In other embodiments, the gelling agent molecule may be depolymerized. As used herein, the term "depolymerized," generally refers to a decrease in the molecular weight of the gelling agent molecule. Suitable gelling agents may be present in the treatment fluids described herein in an amount in the range of from a lower limit of about 0.1%, 0.25%, 0.5%, 0.75%, 1%, 1.25%, 1.5%, 1.75%, 2%, 2.25%, and 2.5% to an upper limit of about 5%, 4.75%, 4.5%, 4.25%, 4%, 3.75%, 3.5%, 3.25%, 3%, 2.75%, and 2.5% by weight of the treatment fluid. In preferred embodiments, the gelling agents may be present in the treatment fluids described herein in an amount in the range of from about 0.01% to about 1% by weight of the treatment fluid.

Crosslinking agents may be used to crosslink gelling agent molecules to form crosslinked gelling agents. Crosslinking agents may comprise at least one ion that is capable of crosslinking at least two gelling agent molecules. Examples of suitable crosslinking agents may include, but are not limited to, boric acid; disodium octaborate tetrahydrate; sodium diborate; pentaborates; ulexite; colemanite; compounds that can supply zirconium IV ions (e.g., zirconium lactate, zirconium lactate triethanolamine, zirconium carbonate, zirconium acetylacetonate, zirconium malate, zirconium citrate, and zirconium diisopropylamine lactate); compounds that can supply titanium IV ions (e.g., titanium lactate, titanium malate, titanium citrate, titanium ammonium lactate, titanium triethanolamine, and titanium acetylacetonate); aluminum compounds (e.g., aluminum lactate or aluminum citrate); antimony compounds; chromium compounds; iron compounds; copper compounds; zinc compounds; and any combinations thereof. Suitable crosslinking agents generally are present in the treatment fluids described herein in an amount sufficient to provide, in-situ, the desired degree of crosslinking between gelling agent molecules. In certain embodiments, the crosslinking agents may be present in an amount in the range from a lower limit of about 0.001%, 0.01%, 0.1%, 0.5%, 1%, 1.5%, 2%, 2.5%, 3%, 3.5%, 4%, 4.5%, and 5% to an upper limit of about 10%, 9.5%, 9%, 8%, 8%, 7.5%, 6.5%, 6%, 5.5%, and 5% by weight of the treatment fluid. In other embodiments, the crosslinking agents may be present in the treatment fluids described herein in an amount in the range from about 0.01% to about 1% by weight of the treatment fluid. Individuals skilled in the art, with the benefit of this disclosure, will recognize the exact type and amount of crosslinking agent to use depending on factors such as the specific gelling agent used, desired viscosity, formation conditions, and the like.

The gelled or gelled and crosslinked treatment fluids described herein may additionally include a gel breaker, such as an enzyme breaker; oxidizing breaker; acid buffer breaker; or temperature-activated gel breaker. The gel breakers cause the treatment fluids to revert to thin fluids that can be produced back to the surface after they have been used in a subterranean formation operation. The gel breaker may be present in the treatment fluids described herein in an amount in the range of from a lower limit of about 0.01%, 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the gelling agent.

In some embodiments, the gas may be present such that the treatment fluid exhibits a foam quality in the range from a lower limit of about 5%, 10%, 25%, 40%, 50%, 60%, or 70% gas volume to an upper limit of about 95%, 90%, 80%, 75%, 60%, or 50% gas volume, and wherein the foam quality of the treatment fluid may range from any lower limit to any upper limit and encompass any subset therebetween. Most preferably, the treatment fluid may have a foam quality from about 85% to about 95%, or about 90% to about 95%.

Suitable foaming agents for use in the treatment fluids described herein may include, but are not limited to, cationic foaming agents; anionic foaming agents; amphoteric foaming agents; nonionic foaming agents; or any combination thereof. Non-limiting examples of suitable foaming agents may include, but are not limited to, surfactants like betaines; sulfated alkoxylates; sulfonated alkoxylates; alkyl quaternary amines; alkoxylated linear alcohols; alkyl sulfonates; alkyl aryl sulfonates; C10-C20 alkyldiphenyl ether sulfonates; polyethylene glycols; ethers of alkylated phenol; sodium dodecylsulfate; alpha olefin sulfonates (e.g., sodium dodecane sulfonate, trimethyl hexadecyl ammonium bromide, and the like); any derivative thereof; or any combination thereof. Foaming agents may be included in treatment fluids described herein at concentrations ranging from a lower limit of about 0.05%, 0.075%, 0.1%, 0.25%, 0.5%, and 0.75% to an upper limit of about 2%, 1.75%, 1.5%, 1.25%, 1%, and 0.075% by weight of the treatment fluid.

In various embodiments, systems configured for preparing, transporting, and delivering the treatment fluids described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey the treatment fluids described herein. The pump may be, for example, a high pressure pump or a low pressure pump, which may depend on, inter glia, the viscosity and density of the treatment fluids, the type of the cementing operation, and the like.

When two treatment fluids are used in accordance with the embodiments herein, the first and second treatment fluids may be introduced into the subterranean formation using a hydrojetting tool. The hydrojetting tool may be attached to a tubular member through which fluids may flow. Use of the hydrojetting tool may be beneficial to prevent premature mixing of the first and second treatment fluid (i.e. the acidizing treatment and the stabilizing resin treatment) until reaching a desired treatment interval. The first or second treatment fluid may be introduced through the hydrojetting tool (i.e., within the tubular member) and the other treatment fluid may be introduced directly into the wellbore in the annulus formed between the subterranean formation and the tubular member of the hydrojetting tool. For example, in some embodiments, the first treatment fluid comprising a base fluid and an in situ acid generating agent is introduced into the subterranean formation through the hydrojetting tool and the second treatment fluid comprising a base fluid and an acid-catalyzed, curable resin is introduced into the subterranean formation in the annulus formed between the tubular member of the hydrojetting tool and the subterranean formation. In other embodiments, the first treatment fluid comprising a base fluid and an in situ acid generating agent is introduced into the subterranean formation in the annulus formed between the tubular member of the hydrojetting tool and the subterranean formation and the second treatment fluid comprising a base fluid and an acid-catalyzed, curable resin is introduced into the subterranean formation through the hydrojetting tool. The first and second treatment fluid may then be contacted within the subterranean formation at a desired treatment interval therein, where the acid and the fluoride releasing agent react and generate hydrofluoric acid slowly over time to create or enhance at least one microfracture in the subterranean formation (e.g., in a fracture). In some embodiments, the steps of introducing the first and second treatment fluid through the hydrojetting tool and the annulus between the tubular member and the subterranean formation and contacting the first and second treatment fluid therein may be repeated at one or more additional treatment intervals.

In some embodiments, the systems described herein may further comprise a mixing tank arranged upstream of the pump and in which the treatment fluids is formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids can be formulated offsite and transported to a worksite, in which case the treatment fluids may be introduced to the tubular via the pump directly from a transport vehicle or a shipping container (e.g., a truck, a railcar, a barge, or the like) or from a transport pipeline. In yet other embodiments, the treatment fluids may be formulated on the fly at the well site where components of the treatment fluids are pumped from a transport (e.g., a vehicle or pipeline) and mixed during introduction into the tubular. In any case, the treatment fluids may be drawn into the pump, elevated to an appropriate pressure, and then introduced into the tubular for delivery downhole.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
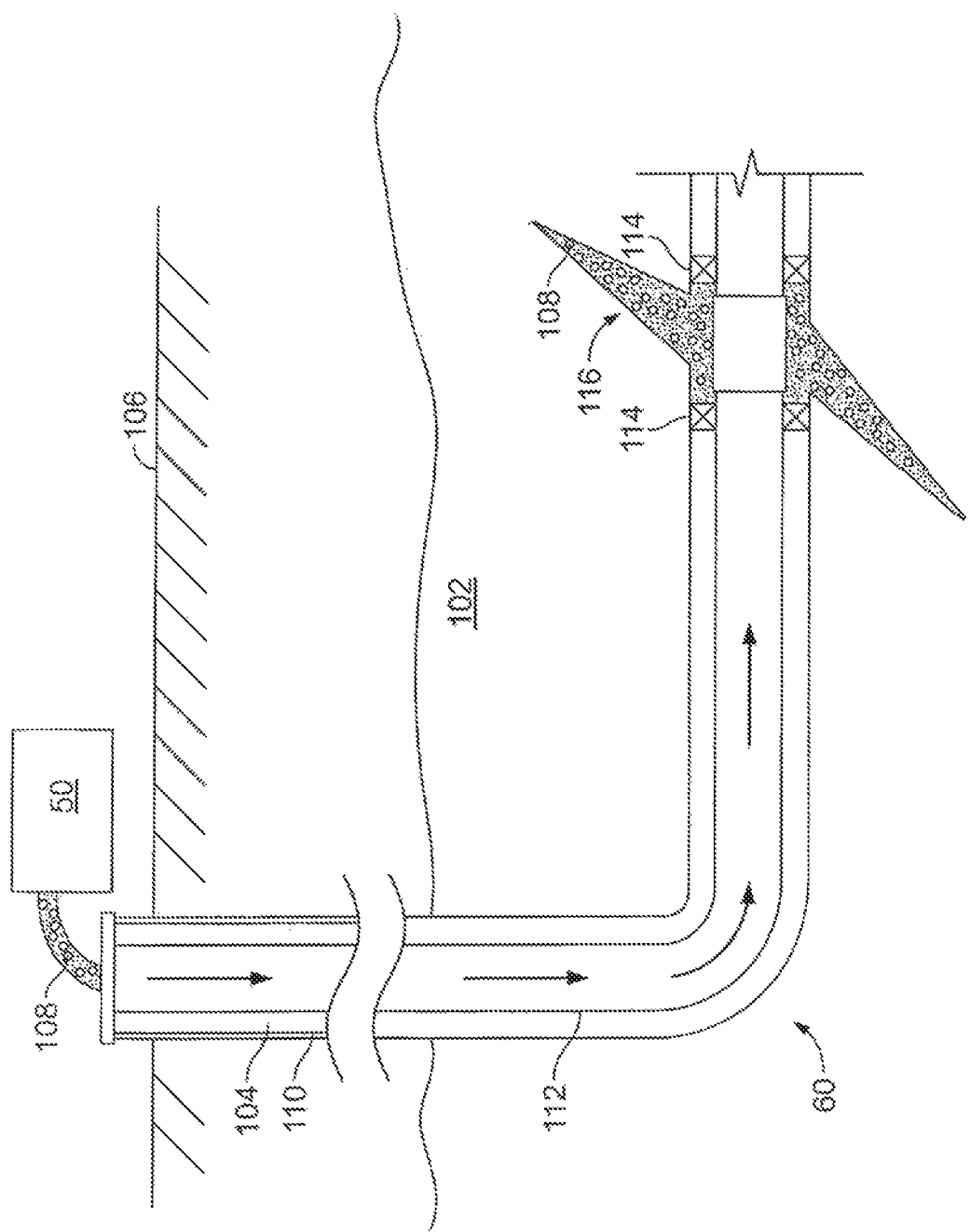
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

While not specifically illustrated herein, the disclosed methods and compositions may also directly or indirectly affect any transport or delivery equipment, used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

What is claimed is:

1. A method comprising:
introducing an acidizing and formation stabilizing treatment fluid into a subterranean formation, the acidizing and formation stabilizing treatment fluid comprising a base fluid, an in situ acid generating agent, and an acid-catalyzed, curable resin;
wherein the acid-catalyzed, curable resin is encapsulated with a degradable capsule;
wherein the in situ acid generating agent generates a first portion of acid in the subterranean formation, the first portion of acid creating or enhancing one or more microfissures therein;
wherein the capsule undergoes a degradation after a predetermined amount of time, generating an unencapsulated acid-catalyzed, curable resin; and
wherein the in situ acid generating agent generates a second portion of acid in the subterranean formation, and the second portion of acid catalyzes a reaction whereby the unencapsulated acid-catalyzed, curable resin is cured.

2. The method of claim 1, wherein the in situ acid generating agent comprises an ammonium salt of an organic acid or an inorganic acid.

3. The method of claim 2, wherein the ammonium salt of an organic acid or an inorganic acid is selected from the group consisting of ammonium formate, ammonium oxalate, ammonium bisulfite, ammonium bisulfate, monobasic ammonium phosphate, dibasic ammonium phosphate, ammonium nitrate, ammonium sulfamate, ammonium sulfate, ammonium sulfite, and combinations thereof.

4. The method of claim 1, wherein the in situ acid generating agent comprises an acid ester selected from methanesulfonic acid or an ester of an organic acid.

5. The method of claim 1, wherein the acid-catalyzed, curable resin comprises one selected from the group consisting of monopolymers of fufuryl alcohol; furan resin; resins obtained by condensation of phenol with furfuryl alcohol; furfuryl-ketone polymers; phenol formaldehyde resins; resin from the condensation of 2,2'-biphenol, ethylene diamine and formaldehyde; melamine resins; alkyldiamino resins; urea formaldehyde resins; and combinations thereof.

6. The method of claim 1, wherein the encapsulating agent comprises a capsule material selected from the group consisting of gelatin, gum arabic, starches, shellac, and rosin, polyvinyl alcohol, polyethylene, polypropylene, polystyrene, polyacrylamides, polyethers, polyesters, polyamides, polybutadiene, polyisoprene, silicones, epoxies, polyurethanes, polyurethane copolyethers, alkylacrylate-acrylic acid copolymer, and combinations thereof.

7. The method of claim 1, wherein the capsule is degraded by thermal degradation, chemically induced degradation, exposure to a shear force, or a combination thereof.

8. The method of claim 1, wherein degradation of the capsule begins after a microfissure has been formed or enhanced by an acid.

9. The method of claim 1, wherein the cured resin stabilizes, consolidates, and/or strengthens a portion of the subterranean formation surrounding the one or more microfissures.

10. The method of claim 1, further comprising mixing the fracturing fluid using mixing equipment.

11. The method of claim 1, wherein the in situ acid generating agent is selected from the group consisting of a lactic acid derivative, methyl lactate, ethyl lactate, propyl lactate, butyl lactate, ethylene glycol monoformate, ethylene glycol diformate, diethylene glycol diformate, glyceryl monoformate, glyceryl diformate, glyceryl triformate, triethylene glycol diformate, formate esters of pentaerythritol, and any combination thereof.

12. The method of claim 1, wherein the in situ acid generating agent is selected from the group consisting of paratoluene sulfonate ester, phosphonate ester, trimethyl formate, methyl methanesulfonate, methyl trifluoroacetate, and any combination thereof.

13. The method of claim 1, wherein the in situ acid generating agent is present in the treatment fluid in an amount between 1% to 25%.

14. The method of claim 1, wherein the acid-catalyzed, curable resin is present in the treatment fluid in an amount between 1% to 25%.

15. The method of claim 1, wherein the degradable capsule has a size between 0.1 to 100 microns.

16. The method of claim 1, wherein the treatment fluid has a pH of 4 to 11.

17. The method of claim 1, wherein the base fluid is an aqueous base fluid, an aqueous-miscible fluid, a water-in-oil emulsion, an oil-in-water emulsion, or any combination thereof.

18. The method of claim 1, wherein the treatment fluid further comprises an additive selected from the group consisting of a salt; a weighting agent; a fluid loss control agent; an emulsifier; a dispersion aid; a corrosion inhibitor; an emulsion thinner; an emulsion thickener; a gelling agent; a surfactant; a particulate; a proppant particulate; a cutting agent; a lost circulation material; a gas; a foaming agent; a pH control additive; a breaker; a biocide; a crosslinking agent; a stabilizer; a chelating agent; a scale inhibitor; a gas hydrate inhibitor; a mutual solvent; an oxidizer; a reducer; a friction reducer; a clay stabilizing agent; and any combination thereof.

19. The method of claim 1, wherein the treatment fluid is gelled, foamed, or gelled and foamed.

20. The method of claim 1, further comprising pumping the treatment fluid with a pump.

* * * * *